March 15, 1938. P. E. BOYD 2,111,061
SAFETY CLUTCH RELEASE FOR PUNCH PRESSES
Filed May 13, 1936 3 Sheets-Sheet 1
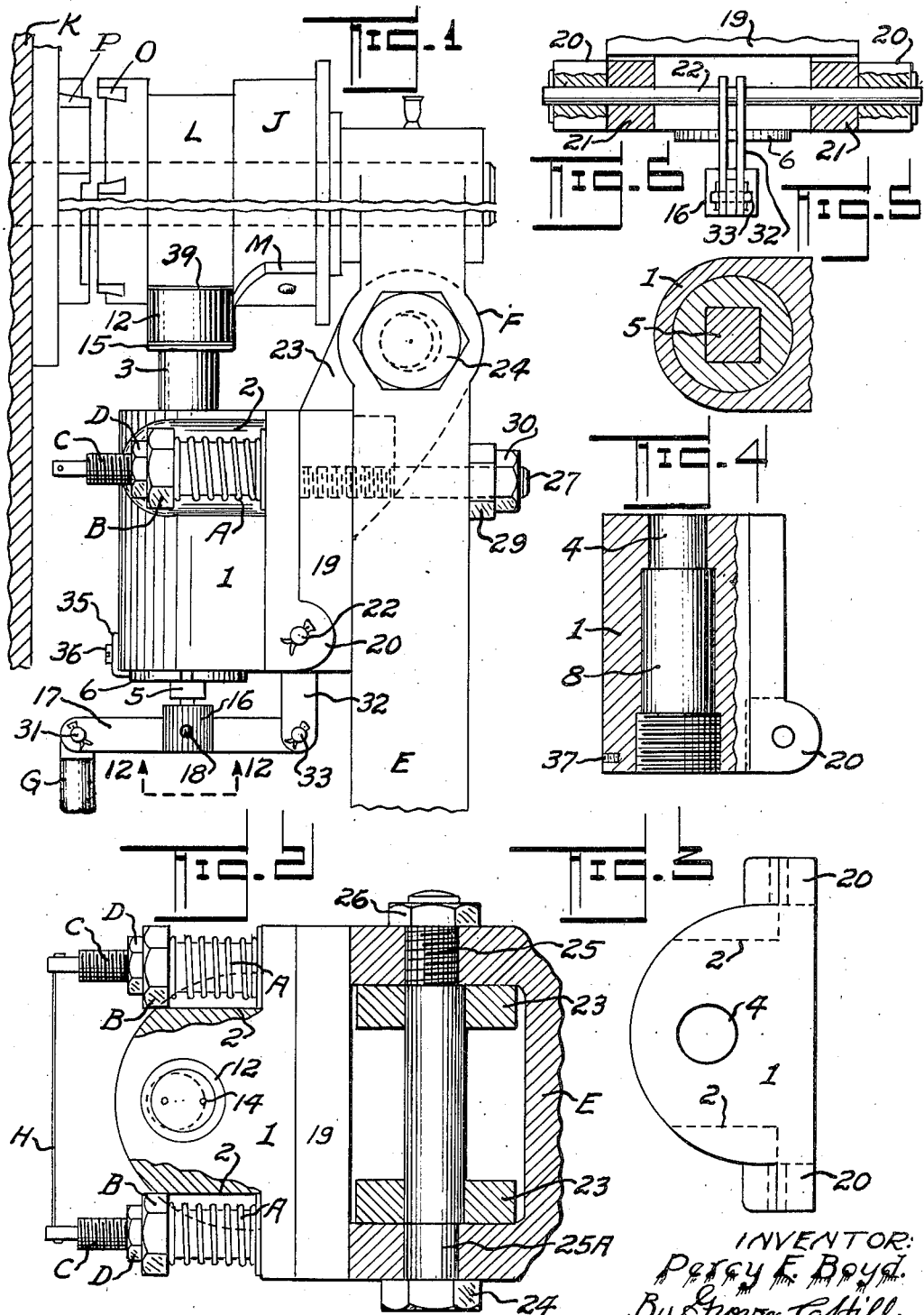
INVENTOR:
Percy E. Boyd.
By Grover C. Hill,
Attorney.

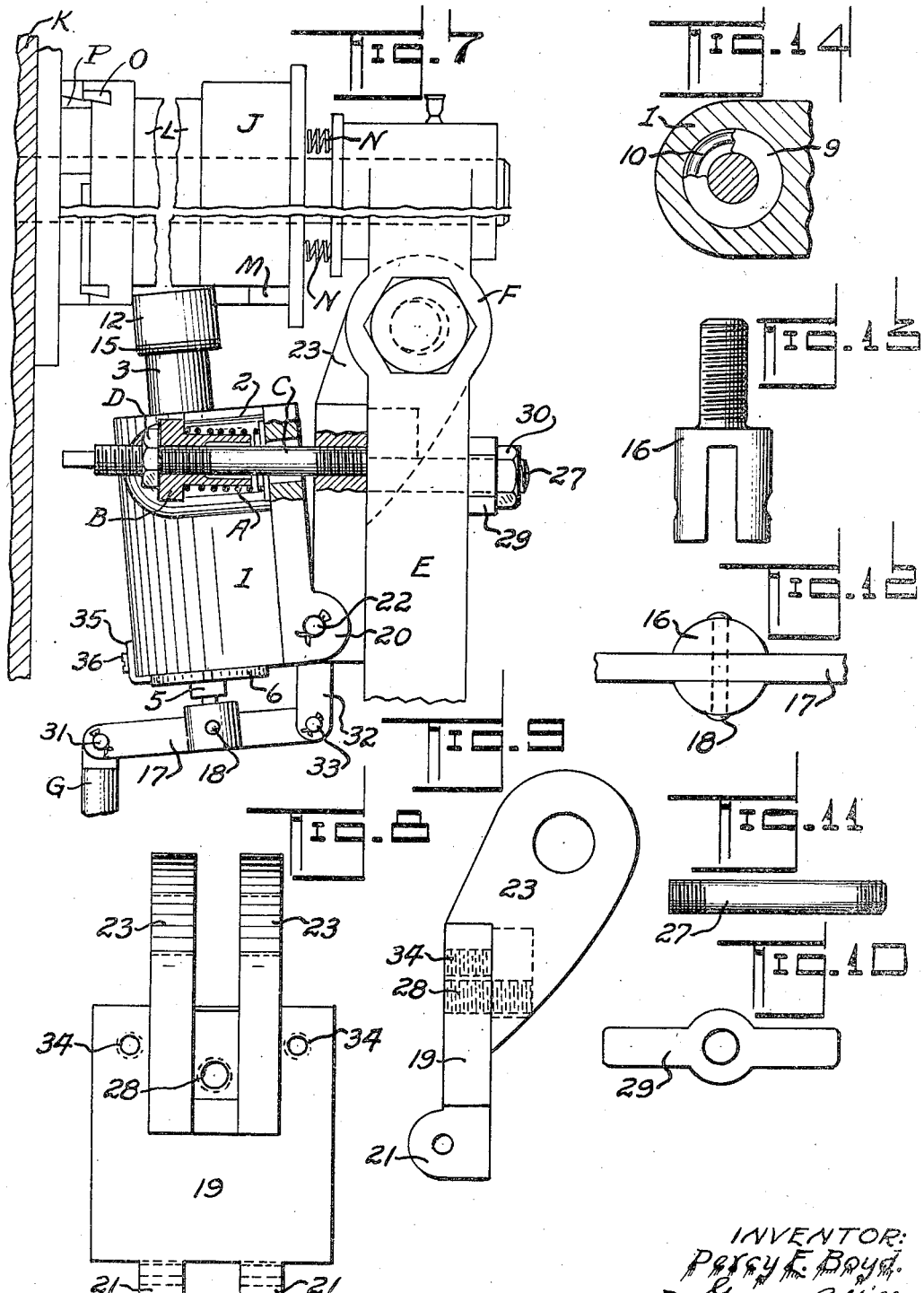

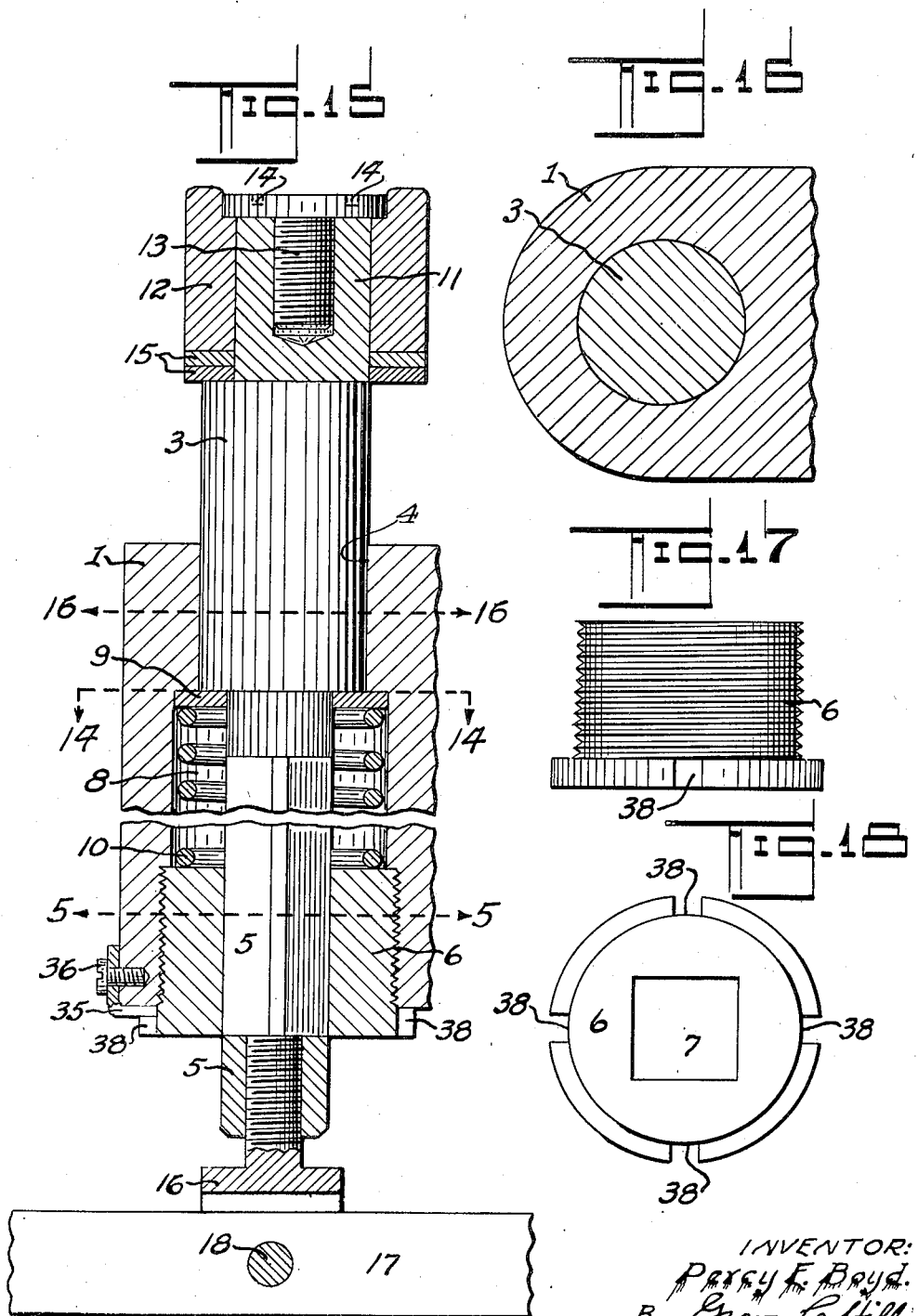

Patented Mar. 15, 1938

2,111,061

UNITED STATES PATENT OFFICE 2,111,061

SAFETY CLUTCH RELEASE FOR PUNCH PRESSES

Percy E. Boyd, Detroit, Mich.

Application May 13, 1936, Serial No. 79,461

7 Claims. (Cl. 192—24)

This invention relates to safety appliances adapted for punch presses and the principal object thereof is to provide a device of this character for the purpose of preventing partial or complete engagement of the jaws of the clutch head and those of the bull gear of the press at a premature period or when the press is not tripped for operation.

This premature or accidental tripping of the press is due to the worn condition of both sets of jaws and inadequate trip mechanism. In this condition the partial engagement of the jaws produces a vigorous knocking or pounding, and after a certain period they are in such condition as to require installation of new sets of jaws in the clutch head and in the bull gear.

This invention completely overcomes this difficulty which is hazardous and expensive, by positively insuring the full separation of the clutch jaws when the clutch is in disengaged or idling condition.

Another object of the invention is to improve the device set forth in United States Patent No. 2,014,758, issued to me September 17, 1935, and also the device set forth in the United States patent application filed by me April 20, 1936, Serial No. 75,291, relating to this line of improvement.

With reference to the drawings:

Figure 1 is a view of the complete device showing the same attached to a punch press and holding the clutch thereof normally disengaged.

Figure 2 is a top plan assembly of the device, showing same connected to a stationary arm of the press with part in section as indicated.

Figure 3 is a top plan view of the bracket; and Figure 4 is a vertically disposed sectional view of said member.

Figure 5 is a reduced section taken upon line 5—5 of forthcoming Figure 15.

Figure 6 is a partial rear elevation and section of the member illustrated in Figures 3 and 4.

Figure 7 is a similar view to Figure 1, but showing the device in the act of disengaging the clutch, bracket I having been tilted to compress springs A, the torque load upon the clutch jaws, however, temporarily preventing axial, disengaging movement of the clutch head.

Figure 8 is a front elevation of the bracket supporting member; and Figure 9 is an end elevation of the same.

Figure 10 is an elevation of the clamping bar.

Figure 11 is an elevation of the clamping bar rod.

Figure 12 is an enlarged view taken at the position of 12—12 of Figure 1.

Figure 13 is an elevation of the yoke member.

Figure 14 is a section taken upon line 14—14 of forthcoming Figure 15.

Figure 15 is a full size sectional assembly of the principal mechanism of the device.

Figure 16 is a section taken upon line 16—16 of Figure 15.

Figure 17 is an elevation of the sleeve member; and Figure 18 is a top plan view thereof.

The invention comprises principal bracket member having body 1 which is provided with a horizontal recess 2 within each side thereof and where indicated. Each of recesses 2 is for accommodating a spring A upon sleeve B, shaft C, and lock nut D. The purpose of this pair of units will be explained later.

Referring more particularly to Figures 4 and 15, it is clearly understood that vertically disposed plunger 3 is employed and the greatest diameter thereof is adapted to rotatably engage counterbore 4 of body 1, and the lower portion of said shaft has a reduced square shank as at 5 which is adapted to slidably engage sleeve member 6 through square passage 7 therethrough.

Within counterbore 8 in body 1 is washer 9, and interposed between the top of sleeve 6 and said washer is expansion spring 10 as indicated. It is clear that sleeve 6 threadedly engages body 1 where shown. Plunger 3 has eccentrically disposed reduced shank 11 thereon upon which is freely mounted roller 12 and said roller is rotatably retained thereon by cap screw 13 having small counterbores 14 for the application of a suitable wrench. Washers 15 are provided where shown and are adapted for a thrust bearing for roller 12.

The lower end of plunger 3 is internally threaded so as to receive yoke member 16 which straddles horizontally disposed bar 17, and is pivotally fixed therewith by pin 18.

Bracket I hingedly engages supporting member 19 by virtue of lugs 20 upon said bracket and lugs 21 upon said member, also shaft 22 passing through all of said lugs with the usual cotter pins for said shaft.

Referring to Figures 8 and 9 it is clear that a pair of upwardly extending ears 23 are provided and are integral with member 19, and are adapted to engage enlargement F of stationary arm E of the press and are rigidly secured thereto by stud 24, and referring to Figure 2 it is seen that eccentrically disposed shank 25 is provided with nut 26 therefor as shown, also eccentrically disposed shank 25A, the purpose of which will be explained later.

In order to reinforce the connection of member 19 with arm E rod 27 is provided and is adapted to threadedly engage member 19 by virtue of aperture 28 therein. Bar 29 is provided as shown in Figure 10 and is the means for supporting rod 27 to stationary arm E with nut 30 for said rod.

Again referring to bar 17, one end of this bar is pivotally secured to vertically disposed rod G as at 31, and said rod has connection with the foot pedal of the press (not shown) and the opposite end of said bar is pivotally secured to vertically arranged bars 32 as at 33. Referring to Figure 6 it is seen that bars 32 are freely mounted upon shaft 22 so as to compensate for the action of bar 17 responsive to the tripping of the press through rod G.

Referring to Figures 7 and 8, it is clear that shafts C are each adapted to threadedly engage member 19 by virtue of apertures 34 therein, which retain the pair of spring units in rigid relation with said member at all times. In Figure 2 wire H serves as a lock for shafts C thereby preventing same from moving after being fixed at any adjusted position.

With reference to Figures 15, 17, and 18, the method employed for locking sleeve 6 in any adjusted position with respect to body 1, comprises L member 35 being detachably secured to body 1 by screw 36 with aperture 37 for same, and said member engaging one of notches 38 upon the flange of sleeve 6 as indicated. Further explanation of this feature will follow later.

The complete details of construction of the invention having been previously described, the operation and advantage thereof follows:—

The device remains normally in the position as indicated in Figure 1 at all times and when the press is idling by virtue of springs A. In this position clutch head J is released from bull gear K with roller 12 within portion L and contacting cam M as shown. When the trip pedal of the press is actuated rod G is simultaneously drawn downwardly. In Figure 15 it is understood that roller 12 will be lowered against the action of spring 10 so as to clear cam M, and head J moves to engage with bull gear K by virtue of springs N within said head, thereby engaging the clutch and rotating the crank shaft of the press for one complete operation thereof.

Figure 1 clearly shows the normal position of all elements with the clutch held in disengaged position by roller 12 and associated elements. In this view springs A have moved bracket 1 to the point of contacting member 19 (springs N being fully compressed). To engage the clutch roller 12 is retracted until the same clears cam M and all elements of head J; then springs N act to shift head J into the engaged position of Figure 7. The clutch remains engaged until roller 12 is permitted to move upwardly. Portion L of head J having moved to the left (from Figure 1 position), roller 12 will upon its upward motion first contact the periphery of the portion of head J carrying cam M; consequently cam M will turn into engagement with roller 12 and the clutch will be disengaged resultant from the coaction of roller 12 and cam M.

After one complete operation of the press and when the clutch is manually released springs A being more powerful than springs N bracket 1 with coordinated elements is returned to the position as in Figure 1.

Shafts C are each provided with adjusting sleeve B so that as the sharp edges of jaws O of the head and jaws P of the bull gear become rounded from wear said sleeves are backed outwardly upon their respective shafts thereby releasing the tension of springs A so as to compensate for said worn jaws. Lock nuts D retain sleeves B in any fixed or adjusted position.

When both sets of jaws of the press are new and unworn springs A are compressed to the extent of their limits obviously so as to accommodate the jaws as they become worn from continued use.

Roller 12 is eccentrically mounted upon plunger 3 so that if necessary, said roller may be rotatably moved in assembling the device to the press so as to properly contact portion L of the clutch head when the clutch is normally disengaged.

The purpose of expansion spring 10 is to return roller 12 to contact cam M with the proper clearance between the top of said roller and portion L of clutch head J after the press is tripped.

The method for adjusting the tension of spring 10 is by disconnecting portion 5 of plunger 3 from yoke 16, then elevating said plunger until square portion 5 thereof clears passage 7 in sleeve 6, and said sleeve being externally threaded, may be turned in either direction. L member 35 having been removed, is again arranged so as to contact one of notches 38 in sleeve 6 and said sleeve is thereby locked by said L member thus preventing said sleeve from moving from any fixed position with respect to bracket 1. Plunger 3 is then reassembled with square portion 5 thereof engaging passage 7 in sleeve 6, and in this manner said sleeve will retain the plunger with roller 12 in an immovable relation with bracket 1 at all times and with mathematical precision.

Referring to Figure 2, stud 24 is provided with eccentrically disposed shank 25 and similar shank 25A, so that by turning said stud until member 19 abuts arm E of the press the proper relation of these elements is thereby quickly attained, and with mathematical precision. Nut 26 is then drawn home thereby locking stud 24 in any predetermined position within the range of the eccentric adjustment aforesaid.

Again referring to Figures 1 and 2, the purpose of eccentric shanks 25 and 25A is that by turning stud 24 because of the eccentric nature of said shanks, ears 23 will draw the device vertically until proper clearance is provided as at 39, and also member 19 may be adjusted to lie perfectly adjacent arm E in the same operation. Stud 24 is then locked in the adjusted position by nut 26 as previously stated. Consequently this eccentric adjustment serves a two-fold purpose.

Having thus fully described my invention, what I claim as new is:

1. In a device of the character described, a bracket and a supporting member therefor, the combination with a pair of units, each of said units having a threaded shaft adapted to threadedly engage said member and having a threaded sleeve thereupon and a spring upon said sleeve, also a lock nut for same, means upon each side of said bracket for the accommodation of said units respectively, said bracket comprising a body, a pair of spaced apart lugs upon the lower portion thereof, a pair of similar lugs upon the lower portion of said member, a shaft passing laterally through all of said lugs and means for retaining said shaft in this relation, thereby completing a hinged engagement of said bracket with the member at the lower portion of the elements named.

2. In a device of the character described, a bracket hingedly related with a punch press, said bracket having a body and a mechanical unit within said body, said unit comprising a plunger, an eccentrically disposed reduced shank upon the top end of said plunger so as to rotatably receive a roller and means for locking said roller thereon, an externally threaded sleeve, said sleeve adapted to engage the bottom of said body in axial alignment with said plunger, a noncircular shank integral with said plunger, passing through said sleeve and projecting from the bottom of said body, and locking means for said sleeve with respect to said body so that the plunger is retained in a predetermined relation with the body aforesaid.

3. In a device of the character described, a bracket member, a unit within said member coacting with the clutch head of a punch press and the actuating member therefor, said unit comprising a vertically arranged plunger within said member, and the upper portion of said plunger projecting upwardly from said member, roller means upon this end of said plunger for engagement with said clutch head, a sleeve adapted to threadedly engage the bottom of said member, a washer within the same, a spring interposed between said washer and said sleeve for returning said roller to a point clearing said head, responsive to manually tripping the foot pedal of the press for one operation thereof.

4. In a device of the class defined, a bracket member having a body a vertically arranged plunger therein, means for retaining said plunger in a fixed predetermined position with respect to said member comprising an externally threaded sleeve adapted to threadedly engage said member, said plunger having a lower extending elongated square shank adapted to slidably pass through a similarly shaped passage in said sleeve, means for retaining said sleeve in a fixed predetermined position upon said member comprising a plurality of circumferentially arranged notches upon said sleeve, an L member detachably secured to said body and adapted to engage one of said notches, and screw means for holding the L member in the relation aforesaid.

5. In a device of the class defined, a bracket and a supporting member therefor, means for hinging said bracket and member at their lower portions thereof, said member having a vertical body, a pair of spaced apart ears projecting upwardly from said body and forming a part of the same, the combination with a stationary arm of a punch press, said ears adapted to be secured to said arm and means for this connection comprising a stud passing through said ears and having a reduced eccentrically disposed shank upon each end of said stud, and the eccentric shanks passing through aforesaid arm, said shanks comprising means for aligning the device with the clutch head of the press and with the arm aforesaid.

6. In a device of the class defined, a bracket and supporting member therefor, the combination with a stationary arm of a punch press, means for detachably securing said member to said arm comprising a horizontal rod adapted to threadedly engage said member and a transversely extending bar adjacent the outer surface of said arm and clamping means for said bar.

7. In a device of the class defined, a bracket member, a vertically arranged plunger within said member, the combination with a trip pedal and a connecting rod of a punch press, a transversely extending bar, a yoke member secured to the bottom end of said plunger and to said bar, one end of said bar pivotally secured to aforesaid rod, aforesaid member having a pair of spaced apart lugs, a hinge shaft passing through said lugs, a pair of vertically extending bars freely mounted upon said shaft and pivotally secured to the opposite end of aforesaid transverse bar, for the purpose of lowering aforesaid plunger responsive to action through said rod by the trip pedal of the press.

PERCY E. BOYD.